Patented Feb. 9, 1926.

1,572,268

UNITED STATES PATENT OFFICE.

NIELS C. CHRISTENSEN, OF SALT LAKE CITY, UTAH.

PROCESS OF TREATING MIXED LEAD-ZINC SULPHIDE ORES.

No Drawing. Application filed December 31, 1923. Serial No. 683,823.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Mixed Lead-Zinc Sulphide Ores, of which the following is a specification.

This process relates to the treatment of lead and zinc sulphide ores for the recovery of lead and zinc therefrom, and particularly the recovery of these in separate products. In part this process is an improvement of or addition to the process disclosed in my patent applications Serial Nos. 327,400, 329,333, 372,691. The process is applicable to the treatment of zinc ores alone but is especially applicable to the treatment of the mixed or so called complex sulphide ores of zinc and lead.

I have found that if such ores are treated with an acid brine that all the lead and part of the zinc may be dissolved in the brine the lead and zinc going into solution as chloride and the sulphur being driven off as $H_2S$ as indicated below:

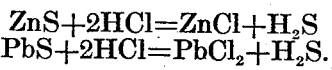

The brine may be made with any of the common chlorides such as NaCl, $CaCl_2$, $MgCl_2$ or a mixture of these, though in most cases NaCl or a mixture of NcCl and $CaCl_2$ will be used. Either HCl or $H_2SO$ may be used to add to the brine though the former is preferable as the latter contaminates the solution with sulphates. Either a hot or cold brine may be used in the process. If it is desired to dissolve as little zinc as possible a cold solution with a minimum of acid may be used. If it is desired to shorten the time of treatment as much as possible, and at the same time dissolve as little zinc as possible, a hot solution may be used with a minimum of acid. These cases would apply particularly to a zinc concentrate carrying lead which it is desired to remove. If it is desired to dissolve not only the lead but also to dissolve out all the zinc possible, as might be the case in the treatment of a Pb—Fe concentrate in which the pyrite residue contains gold and silver and would be shipped to a smelter for treatment, the hot brine with an excess of acid would be used.

The process is particularly directed to the precipitation of the lead and zinc from the brine in separate products.

My method consists in using the $H_2S$ as a precipitant in combination with calcium hydroxide or lime in such a manner as to secure the lead and zinc as separate precipitated sulphide products, in the manner as described below. I have found that the lead and zinc may be completely separated from the brine solution by the addition of finely ground $Ca(OH)_2$ and thus first precipitating them as hydroxides and thereafter adding $H_2S$ to the solution, and converting the hydroxides to sulphides as indicated below:

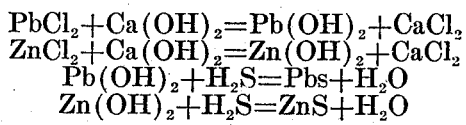

I have also found that the precipitated ZnS will completely precipitate the Pb from the solution as indicated below:

The lead and zinc may also be precipitated from the solution by the addition of CaS or CA (SH) made by absorbing the $H_2S$, made in the treatment of the ore with the acid brine, with $Ca(OH)_2$ or lime as indicated below:

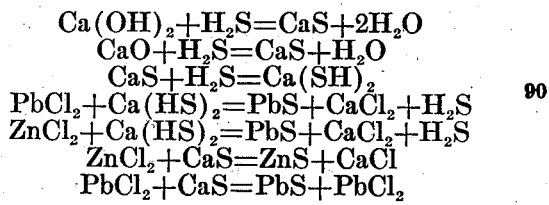

The use of the $Ca(HS)_2$ as the precipitant is much preferred as it is soluble and may be used in solution but has the disadvantage of requiring the reabsorption of the excess molecule of $H_2S$ if it is desired to use this over again in the process. The CaS being in solid form precipitates the sulphides around the particles of CaS and prevents complete using up of the CaS and thus contaminates the products with the CaS. My method of securing separate precipitates may be carried out in two ways. I have found that if the amount or less than the amount of $Ca(SH)_2$ necessary to precipitate the lead according to the chemical equation given above, the lead may be precipitated free from zinc sulphide, and after removing the precipitates from the brine the zinc may be completely precipitated by the addition of more $Ca(HS)_2$. To get the exact amount of $Ca(SH)_2$ to precipitate the Pb alone is difficult the products would in most cases be contaminated, either the lead with zinc or the zinc with lead according to whether an excess or too little $Ca(HS)_2$ was used for the lead precipitation. This difficulty may be overcome in the process by the following procedure: A little less than enough (CaHS) to precipitate the lead is added to the solution giving a zinc free lead sulphide precipitate. Then enough $Ca(HS)_2$ to precipitate the residual lead and a small amount of zinc is added. Then enough $Ca(HS)_2$ to precipitate the zinc is added giving a lead free zinc sulphide precipitate. The small mixed zinc lead sulphide precipitate is added to the original solution before any $Ca(HS)_2$ is added. The zinc sulphide in this precipitates the lead as a sulphide and the zinc goes into solution as zinc chloride. In this way the zinc and lead are secured as two separate clean sulphide precipitates.

This process is applicable to the treatment of lead, zinc ores or concentrates in which the primary object is the recovery of the lead and the recovery of incidentally dissolved zinc is secondary and is also applicable to the treatment of ores and concentrate in which the object is not only to recover the lead but also to recover as much of the zinc as possible from the ore or product. The method of treating the ore or product will depend upon the object of the treatment. If it is desired to recover the lead and dissolve as little zinc as possible, the ore may be treated with a cold acid brine. If the object is to recover the lead and dissolve out all the zinc possible the ore may be treated with a hot acid brine, and part of the lead may be recovered as a chloride. In any case, however, the lead and zinc recovered will be recovered substantially in the manner described. If it is desired to recover all the lead as a chloride from a hot solution, the lead precipitated as a sulphide may be redissolved in the hot acid brine in the treatment of more ore. In this case it is not necessary to be so exact in the method of precipitating the lead as any small amount of zinc sulphide mixed with the lead would be dissolved in the acid brine and not being precipitated by cooling would separate from the lead.

Having described my process, what I claim and desire to patent is:

1. The process of treating lead-zinc ores and the like which consists in mixing said finely ground ores with an acid concentrated brine and thereby dissolving the lead and some of the zinc as chlorides in said brine and driving off the sulphur combined with said metals as $H_2S$ and treating said $H_2S$ with lime to form calcium sulph-hydrate and using said calcium sulph-hydrate to precipitate from said brine solution as sulphides first the lead, and thereafter the zinc, substantially as described.

2. The process of treating lead-zinc ores and the like which consists in mixing said finely ground ores with an acid concentrated brine and thereby dissolving the lead and some of the zinc as chlorides in said brine and driving off the sulphur combined with said metals as $H_2S$ and treating said $H_2S$ with lime to form calcium sulph-hydrate and using said calcium sulph-hydrate to precipitate from said brine solution first lead as a sulphide, thereafter a mixture of lead and zinc sulphides, and then zinc as a sulphide, substantially as described.

3. The process of treating lead-zinc ores and the like which consists in mixing said finely ground ores with an acid concentrated brine and thereby dissolving the lead and some of the zinc as chlorides in said brine and driving off the sulphur combined with said metals as $H_2S$, and treating said $H_2S$ with lime to form calcium sulph-hydrate, and using said calcium sulph-hydrate to precipitate from said brine solution first lead as a sulphide, thereafter a mixture of lead and zinc sulphides, and then zinc as a sulphide, substantially as described, and adding said mixed precipitates of lead and zinc sulphides to other unprecipitated brine solution and thereby precipitating lead as a sulphide from said solution and dissolving the zinc sulphide out of said mixed precipitates.

4. The process of treating lead-zinc ores and the like which consists in mixing said finely ground ores with an acid concentrated brine and hereby dissolving the lead and some of the zinc as chlorides in said brine and driving off the sulphur combined with said metals as $H_2S$, and treating said $H_2S$ with lime to form calcium sulph-hydrate and using said calcium sulph-hydrate to precipitate from said brine solution zinc sulphide and using said zinc sulphide to precipitate lead as a sulphide from other brine solution.

NIELS C. CHRISTENSEN.